United States Patent [19]
Wieland

[11] Patent Number: 4,574,210
[45] Date of Patent: Mar. 4, 1986

[54] EXTERNAL ROTOR MOTOR HAVING A COOLING SYSTEM

[75] Inventor: Heinz Wieland, Waldenburg, Fed. Rep. of Germany

[73] Assignee: Wilhelm Gebhardt GmbH, Waldenburg, Fed. Rep. of Germany

[21] Appl. No.: 511,396

[22] Filed: Jul. 7, 1983

[51] Int. Cl.[4] .............................................. H02K 9/00
[52] U.S. Cl. ........................................ 310/59; 310/61; 310/62; 310/64; 310/67 R
[58] Field of Search .................. 310/67 R, 52, 62, 63, 310/58, 59, 64, 65, 61

[56] References Cited

U.S. PATENT DOCUMENTS 4,132,912  1/1979  Wright ................................. 310/63

FOREIGN PATENT DOCUMENTS

| 1076495 | 10/1954 | France ............................ 310/67 R |
| 2494517 | 5/1982 | France ................................. 310/63 |
| 706660 | 3/1954 | United Kingdom ................... 310/62 |
| 0789038 | 1/1958 | United Kingdom ................... 310/67 |
| 0875059 | 8/1961 | United Kingdom ................... 310/62 |
| 0952352 | 3/1962 | United Kingdom ................... 310/62 |
| 0904258 | 8/1962 | United Kingdom ................... 310/52 |
| 1077540 | 5/1966 | United Kingdom ................... 310/67 |
| 2008332 | 11/1977 | United Kingdom ................... 310/52 |
| 2021330 | 11/1979 | United Kingdom ................... 310/62 |
| 1578268 | 11/1980 | United Kingdom ................... 310/52 |
| 2091947 | 8/1982 | United Kingdom ................... 310/52 |

Primary Examiner—R. Skudy
Attorney, Agent, or Firm—Steven L. Permut; Malcolm L. Sutherland; Leon E. Redman

[57] ABSTRACT

An external rotor motor used in drying fans and blowers provides an air current within a hollow fixed post which passes through the stator of the motor so that heat is transferred to the air current from the stator interior and transported by the air current to the end of the hollow post. At the end of the hollow post there is an air foil mounted normal to the post and designed for producing a radial air flow in a space between the air foil and the end plate of the rotor. An air flow produced by the impellers mounted to the rotor draw the air from the space and produces the current of air in the hollow post which thereby removes heat from the stator. Heat pipes may also be mounted within the hollow shaft to remove heat from the stator.

8 Claims, 8 Drawing Figures

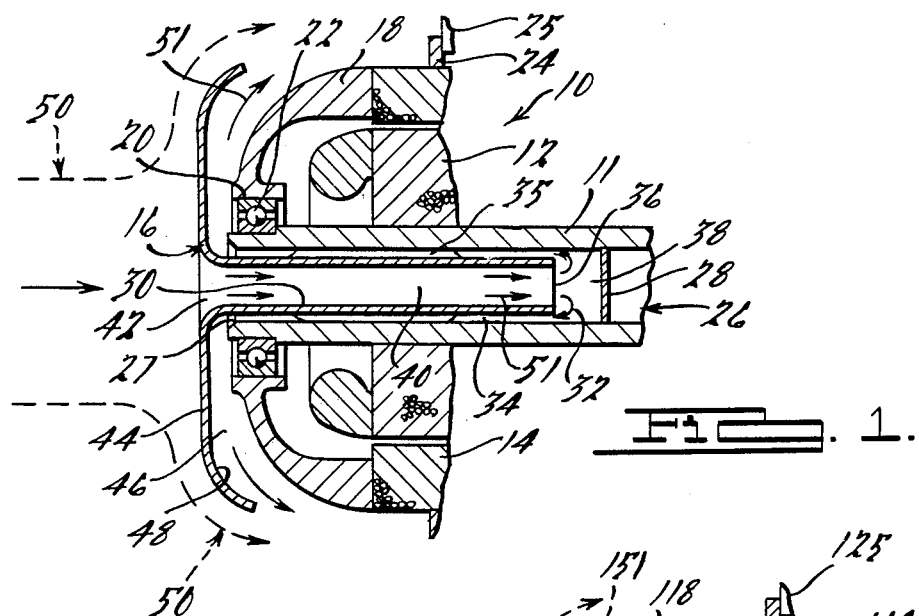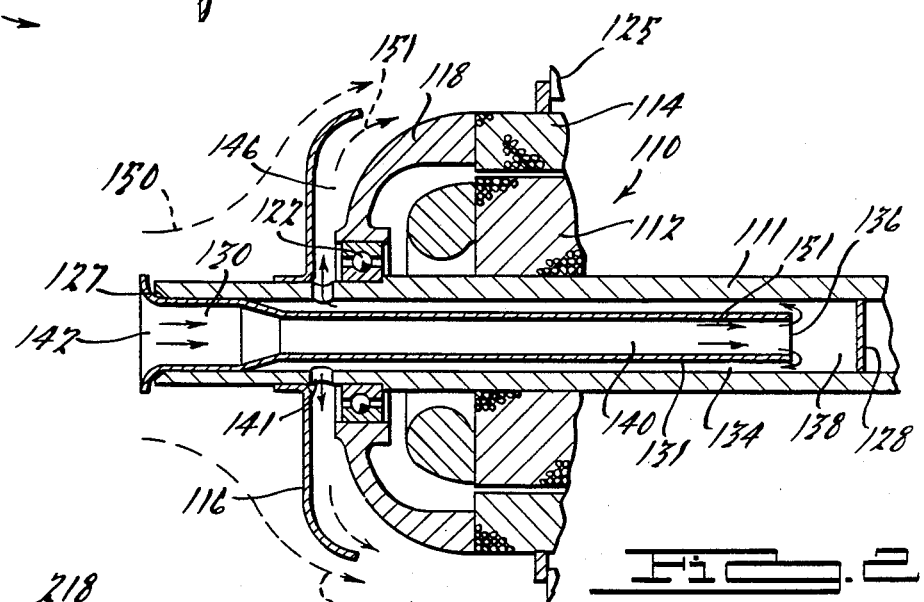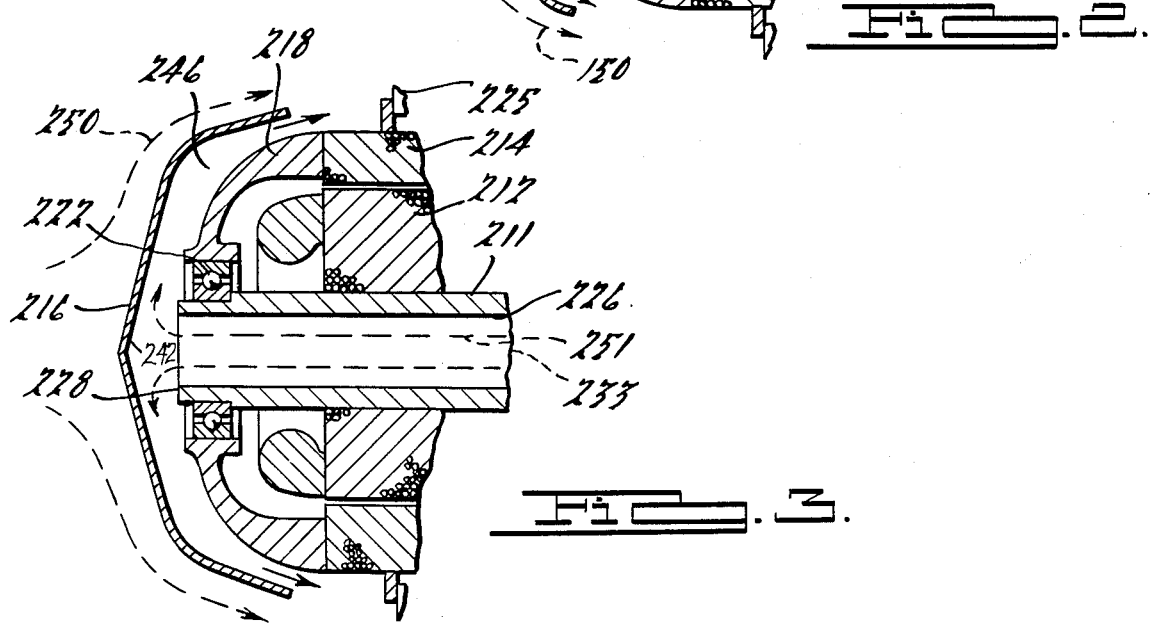

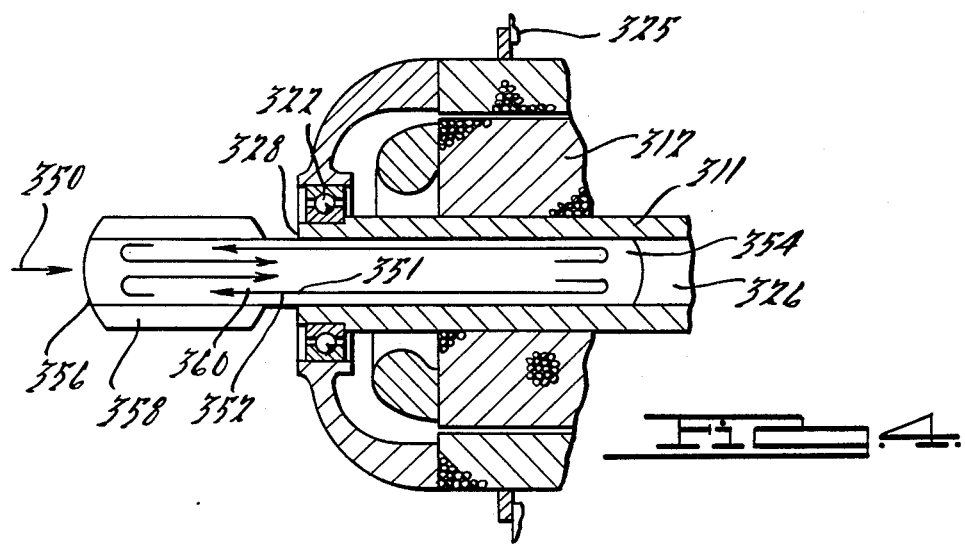
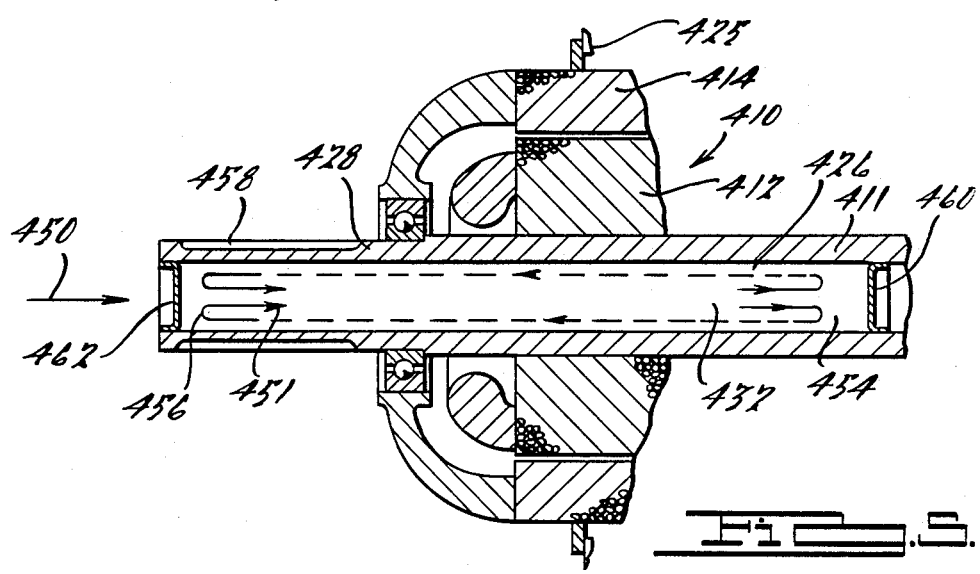
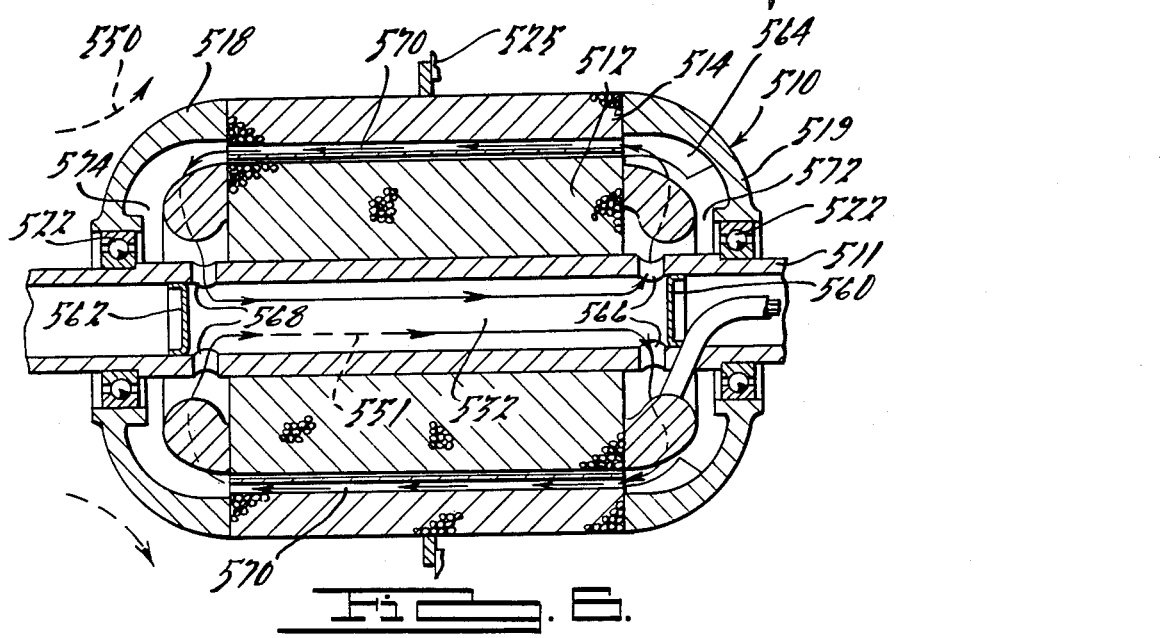

EXTERNAL ROTOR MOTOR HAVING A COOLING SYSTEM

TECHNICAL FIELD

The present invention relates to external rotor motors and more specifically to an external rotor motor incorporating a cooling system.

DISCLOSURE INFORMATION

In external rotor motors, the cooling arrangement is an important aspect. Commonly, only the external surface of the externally placed rotor is cooled by the cooling medium. The heat produced in the winding is transferred to the rotor either by conduction or convection before it is transported away by the flowing cooling medium current. In many applications such a cooling arrangement is not sufficient. One solution to increase the cooling capacity is to open the rotor for entry of the cooling medium. For example, holes are placed in the rotor through which air can enter in order to flow around the windings. However, the disadvantage for providing extra cooling capacity is that the windings of the motor are no longer protected from the outside environment. Air entering the interior could introduce undesirable abrasive particles and dirt which could possibly damage the windings.

What is needed is an external rotor motor with a high cooling efficiency while maintaining a sealed interior that protects the windings.

SUMMARY OF THE INVENTION

According to the invention, an external rotor motor has an interior stator and an external rotor rotatably mounted about the stator. The stator is mounted on a hollow shaft. The hollow shaft rotatably mounts the rotor thereon. The rotor forms with the shaft a sealed interior in which the windings of the stator and rotor are placed.

In one embodiment, the hollow shaft has a heat pipe mounted therein. The heat pipe has a outer portion extending beyond the axial end of the rotor such that the inner portion of the heat pipe transports heat from the stator to the outer portion of the heat pipe. The outer portion is cooled by a flow of air thereabout. The cooling effect creates a flow of the heat transporting medium within the heat pipe.

In another embodiment, the hollow shaft has a seal placed axially within the stator. A sleeve is mounted within the hollow open end of the shaft and an air foil i.e. a deflecting plate is mounted about the sleeve and spaced from the end of the rotor to provide a space between the rotor and the air foil. The sleeve has an outer diameter that is smaller than the inner diameter of the hollow shaft to provide a tubular passage about the sleeve. A flow of air enters the sleeve and passes near the seal and then into the tubular passage and out to the space between the rotor and the air foil. A main flow of air about the foil draws the air from the gap between the rotor and the foil to produce the flow of air through the sleeve.

In broader terms, one aspect of the invention relates to an arrangement within the stator for generating a first axial flow of a heat transporting medium for transporting heat from an interior part of the stator toward at least one axial end thereof. A system for generating a second flow of heat transporting medium transports heat away from the axial end that is delivered by the first flow.

Another aspect of the invention relates to a shaft rigidly supporting the stator in a rotor with a shaft extending between end plates attached to the rotor. Bearings rotatably mount the end plates to the shaft. The shaft is either supported by a flange adjacent one set of bearings or used as a post and supported by a structure spaced away from the bearings.

BRIEF DESCRIPTION OF THE DRAWINGS

Reference now will be made to the accompanying drawings in which:

FIG. 1 is a schematic fragmentary side elevational and segmented view of an external rotor motor according to the present invention;

FIG. 2 is a view similar to FIG. 1 illustrating a second embodiment;

FIG. 3 is a view similar to FIG. 1 schematically illustrating a third embodiment;

FIG. 4 is a view similar to FIG. 1 illustrating a fourth embodiment;

FIG. 5 is a view similar to FIG. 1 illustrating a fifth embodiment;

FIG. 6 is a side elevational and segmented view illustrating a sixth embodiment;

DETAILED DESCRIPTION OF THE PREFERRED EMBODIMENT

Figure 7:
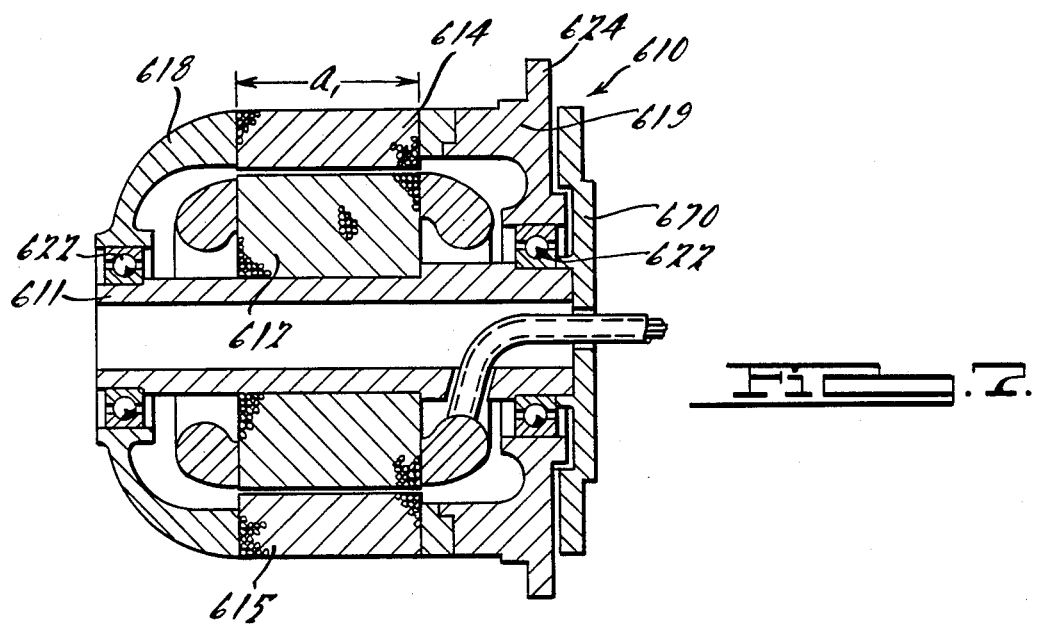
FIG. 7 is a side elevational segmented view illustrating a shaft mounted onto a supporting flange.

Referring now to FIG. 1, an external rotor motor 10 includes a hollow shaft 11 which fixedly supports a stator 12 and rotatably supports a rotor 14. An air foil or deflecting plate structure 16 provides for air flow or other heat transporting medium within the stator and back out to provide transport of heat from within the motor to the exterior.

The rotor 14 has end plates 18 attached thereto. Because the rotor and stator can be symmetrical, only one end plate 18 is shown for simplicity of the drawing. Each end plate 18 has a central opening 20 and a set of bearings 22 which mount the end plate 18 rotatably to the shaft 11 having a longitudinal axis. The rotor has a flange 24 for fixing an impeller 25 thereto. The shaft 11 has a hollow interior 26 with an open end 27 at the bearings 22. Positioned within the shaft and axially within the interior of stator 12 is a closure disc 28.

The air foil or deflecting plate structure 16 has a tubular sleeve section 30 that fits within the hollow open end section 32 on the axial outer side of closure disc 28. The sleeve has a diameter smaller than the internal diameter of the shaft 11 to provide for a tubular clearance 34 therebetween. The sleeve is pressed fit in position in shaft 11 by a plurality of circumferentially spaced flanges 35. The sleeve has an inner end 36 that is spaced from the closure disc 28 to provide for a space 38 therebetween. The interior passage 40 of tubular sleeve 30 has an open front end 42 and provides for a continuing path therethrough to the tubular clearance 34.

The air foil structure 16 has a radially extending section 44 which is spaced from the end plates 18 to provide for a gap or channel 46 therebetween. The radially extending section 44 has a curvature to provide a concave surface 48 that faces the rotor end plate 18. The gap 46 is in communication with the tubular passage 34 about the sleeve.

When the motor is on, the rotor 14 moves the impellers 25 to provide the main air flow generally indicated by the arrows at 50. The air within the gap 46 is drawn out therefrom by the main air flow 50 commonly referred to as suction. The interior 40, the space 38, and the tubular clearance 34 forms a passage. Consequently, the air within the tubular clearance 34, the air within space 38 and the air within the interior 40 of sleeve section 30 is drawn therethrough creating a secondary current of air indicated as 51. A portion of the main air flow 50 flows to the interior 40 of the sleeve section 30 to replace the drawn air.

Heat generated within the stator 12 is transferred through the shaft 11 to the hollow interior 26. The axially directed flow of air through the shaft 11 carries the heat from the interior to the open end 28 of the shaft and out through the gap 46. The main flow of air 50 carries the heated air within the gap 46 out past the impeller 25. The main flow of air 50 produces the flow of air 51 through the tubular sleeve and the tubular clearance 34 which in turn carries the heat from inside the stator to the axial end of the rotor. The main flow of air 50 then transports the heated air away from the motor.

Referring now to FIG. 2, a second embodiment of the invention is shown. In this embodiment, the motor 110 has a hollow shaft 111 extending beyond the bearings 122. The hollow shaft 111 similarly fixedly mounts the stator 112 and rotatably mounts the rotor 114.

The open end 127 of the shaft 111 has a sleeve 130 mounted therein. The tube has a reduced diameter section 131 which forms a tubular clearance 134 between it and the inner diameter of shaft 111. The sleeve 130 has an inner end 136 spaced from closure 128 which forms a gap 138 therebetween. The interior 140 of the sleeve 130 is then in communication with the clearance 134. The shaft 111 has mounted thereabout air foil or deflecting plate 116. The air foil or deflecting plate 116 is positioned from the end caps 118 of the rotor 114 to form a gap 146 therebetween. The shaft 111 has apertures 141 therethrough which communicate the tubular clearance 134 with the gap 146.

The operation of the embodiment in FIG. 2 is similar to the embodiment in FIG. 1. The main flow of air indicated as 150 draws out air from the gap 146 which thereby pulls air from tubular clearance 134 which in turn draws air from the end 142 of the sleeve 131 to form secondary current 151. The current of air within the shaft 111 transports the heat from the stator 112 to the gap 146. The heated air in gap 146 is then carried away by the impeller 125.

Referring now to FIG. 3, the air foil or deflecting plate 216 in this embodiment does not have a central opening. Instead, it has a central area 242 spaced from the end 228 of shaft 211. The air foil 216 can be supported beyond the end 228 of hollow shaft 211 and spaced from the front end plate 218 of rotor 214 to form a gap 246 therebetween. The shaft 211 is tubular with a rear open end 233 to provide air flow through the interior 226 of shaft 211 into gap 246. The main flow of air 250 caused by impeller 225 creates the flow of air 251 which cools stator 212. Air enters the downstream end 233 of shaft 211 and passes through interior 226 where it carries heat from the stator. The heated air passes into gap 246 where it is drawn by the main flow of air 250.

A method of producing a cooling effect without external air flowing through the shaft is by use of a heat pipe mechanism. Referring now to FIG. 4, the shaft 311 supports stator 312 and has an end 328 adjacent the bearings 322 which rotatably mounts rotor 314. A heat pipe 352 has an inner end 354 extending within the hollow interior 326 of shaft 311. The pipe 352 has an outer end 356 that extends beyond the open end 328. The end 356 has axially extending fins 358. The heat pipe has an interior 360 filled with a heat transporting medium such as air, alcohol or water. The air flow generally indicated as 350 passes by the axial fins 358 to cool them thereby cooling the heated medium at the outer end 356. The cooling of the medium sets up a flow generally indicated as 351 between interior end 354 and exterior end 356. Heat created within stator 312 is transferred to the interior end 354 and is transported by the medium to the exterior end 356 where the fins 358 allow the heat to be conducted therethrough and be transported away by the flow of air 350.

A fifth embodiment, shown in FIG. 5, also incorporates a heat pipe mechanism. In this embodiment, the motor 410 has a fixed stator 412 and rotor 414 rotatably mounted on the hollow shaft 411. The shaft has an outer end 428 and an interior portion 426. Two end covers 460 and 462 close off a hollow portion 432. The hollow portion 432 has an inner section 454 and an outer section 456. The outer end 428 has axially extending fins 458.

In operation, the heat pipe functions similarly to the heat pipe 352 in FIG. 4. The interior 432 is filled with a heat transporting medium. The fins 458 are cooled by an axial air flow indicated generally as 450. The cooling of the heated air in end section 456 sets up a current 451 of the medium within the interior 432 that transports heat from the interior section 426 to the fins 458.

Reference now will be made to FIG. 6 which discloses an embodiment which provides for an interior forced air current 551. In this embodiment, the motor 510 has a hollow shaft 511 rotatably mounting the rotor 514 by bearings 522. The end plate 519 has radially extending vanes 564. The rotor 514 has a plurality of longitudinal tubular passages 570. The shaft 511 has a hollow interior 532 which is closed off by end closures 560 and 562. The shaft has, adjacent the ends of the stator 512, apertures 566 and 568 which communicate the interior 532 to radially extending gaps 572 and 574 between the stator 512 and the front and rear plates 518 and 519, respectively. The gaps 572 and 574 communicate the interior 554 with the tubular passages 570.

When the motor is turned on, the vanes 564 draw air from the interior 532 through the apertures 566 and end gap 572 and force the air through the tubular passage 570 against the rotor end plate 518, and back to the interior 532 to form current 551. The air within interior 532 is heated by stator 512 and transported to the front gap 574 whereby the end plate 518 is heated. The end plate 518 transfers the heat from the current within the rotor to the current generally indicated as 550 caused by impellor 525 which transports the heat away. The air in the gap 574 then returns through apertures 568 to the interior 532 to be recycled.

Figure 8:
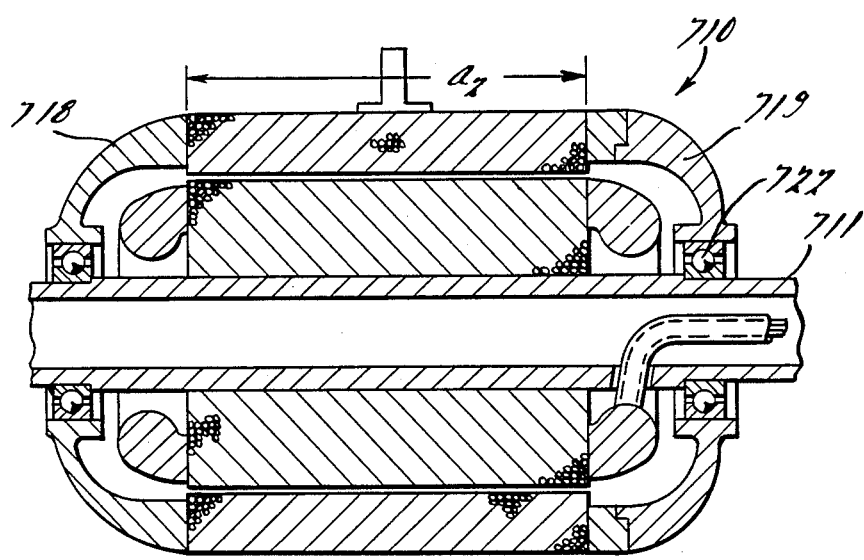
FIG. 8 is a view similar to FIG. 7 illustrating an embodiment where the shaft functions as a post for supporting the motor.

Referring now to FIGS. 7 and 8, it can be seen that two different kinds of external rotor motors 610 and 710 can be made with many of the parts interchangeable. Referring specifically to FIG. 7, the shaft 611 is rotatably mounted to shaft 611 by bearing 622. The rotor generally indicated as 612 has a winding section 615 and a front end plate 618 and a rear end plate 619 which has integral therewith a mounting flange 624. The shaft 611 ends adjacent bearing 622 and mounts to a support flange 670. The support flange can be bolted or otherwise mounted onto a structural support.

By using the same stator and the same rotor windings and same front end plate, and using different shafts, one can convert the embodiment in FIG. 7 to the one shown in FIG. 8. In FIG. 8, the shaft 711 extends beyond the bearing 722. The rear end plate 719 is identical to a front end plate 718. The shaft 711 is used as a mounting post to support the stator and rotor thereon. In this fashion, one may build two different kinds of external rotor motors incorporating many interchangeable parts.

Variations and modifications of the present invention are possible without departing from its scope and spirit as defined in the appended claims.

The embodiments of the invention in which an exclusive property or privilege is claimed are defined as follows:

1. An external rotor motor having an external rotor and an inner fixed stator, said motor characterized by:
   a shaft having an axially extending hollow interior with said stator fixed on said shaft;
   said rotor rotatably supported on the shaft;
   a deflecting plate axially spaced away from said rotor and stator and radially extending outward from a central longitudinal axis of said shaft to form a channel between said plate and said rotor;
   said shaft having a passage formed within the axially extending hollow interior to receive a heat transporting medium and to pass said heat transporting medium to said channel and radially outward through said channel to form a first flow of said heat transporting medium;
   means for generating a second flow of said heat transporting medium on an opposite side of said deflecting plate with respect to said channel and radially beyond said deflecting plate such that a suction effect occurs at an outer periphery of said channel to produce said first flow.

2. An external rotor motor as defined in claim 1 further characterized by:
   said shaft having an inlet end facing upstream into said second flow of said heat transporting medium;
   said shaft having a closure spaced from said inlet end in said interior of said stator;
   a tubular sleeve open at its opposite ends and being positioned within said shaft;
   said sleeve having a smaller diameter than the inner diameter of said shaft to form an annular space therebetween;
   said sleeve having an inner end being spaced from the closure to provide fluid communication from an interior of the sleeve to the annular space;
   said deflecting plate having a center opening in communication with the interior of said sleeve;
   said annular space being in fluid communication with said channel between said rotor and said plate.

3. An external rotor motor as defined in claim 2 wherein said deflecting plate has its outer periphery being curved toward said rotor and stator.

4. An external rotor motor as defined in claim 2 wherein said deflecting plate and said tubular sleeve are integrally formed.

5. An external rotor motor as defined in claim 2 wherein:
   said shaft has a section projecting axially beyond the position where said rotor is rotatably mounted on said shaft;
   said deflecting plate is mounted onto said axially projecting section;
   said shaft has circumferentially spaced holes between said rotor and said deflecting plate to provide communication between said annular space and said channel.

6. An external rotor motor as defined in claim 5 wherein:
   said sleeve has an enlarged outer end which closes off said annular space about the sleeve and shaft at the projecting shaft section.

7. An external rotor motor as defined in claim 6 wherein:
   said enlarged outer end of said sleeve is fastened to the projecting shaft section.

8. An external rotor motor as defined in claim 1 further characterized by:
   said shaft having both its ends being open;
   said deflecting plate having a closed central area and having its outer periphery curved toward said rotor and stator;
   said passage extending from one end of said shaft to an end of said shaft facing said deflecting plate;
   said deflecting plate being supported at a position such that said facing end is spaced from said central area of said deflecting plate to form a channel therebetween.

* * * * *